(12) United States Patent
Tipparaju et al.

(10) Patent No.: US 9,594,595 B2
(45) Date of Patent: Mar. 14, 2017

(54) EFFICIENT PROCESSOR LOAD BALANCING USING PREDICATION FLAGS

(71) Applicant: Advanced Micro Devices, Inc., Sunnyvale, CA (US)

(72) Inventors: Vinod Tipparaju, Austin, TX (US); Lee W. Howes, Austin, TX (US); Thomas Scogland, Blacksburg, VA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 261 days.

(21) Appl. No.: 13/897,141

(22) Filed: May 17, 2013

(65) Prior Publication Data

US 2014/0344830 A1    Nov. 20, 2014

(51) Int. Cl.
*G06F 9/50* (2006.01)
*G06F 9/48* (2006.01)

(52) U.S. Cl.
CPC ............ *G06F 9/505* (2013.01); *G06F 9/4881* (2013.01); *G06F 9/5083* (2013.01)

(58) Field of Classification Search
None
See application file for complete search history.

(56) References Cited

U.S. PATENT DOCUMENTS

| | | | |
|---|---|---|---|
| 7,159,221 B1* | 1/2007 | Willen | G06F 12/0806 711/117 |
| 2004/0054999 A1* | 3/2004 | Willen | G06F 9/5044 718/103 |
| 2008/0244588 A1* | 10/2008 | Leiserson | G06F 9/4881 718/102 |
| 2009/0300333 A1* | 12/2009 | Harper, III | G06F 9/5088 712/220 |
| 2013/0111000 A1* | 5/2013 | Kravitz et al. | 709/223 |

* cited by examiner

*Primary Examiner* — Qing Wu
(74) *Attorney, Agent, or Firm* — Volpe and Koenig, P.C.

(57) ABSTRACT

A system and methods embodying some aspects of the present embodiments for efficient load balancing using predication flags are provided. The load balancing system includes a first processing unit, a second processing unit, and a shared queue. The first processing unit is in communication with a first queue. The second processing unit is in communication with a second queue. The first and second queues are each configured to hold a packet. The shared queue is configured to maintain a work assignment, wherein the work assignment is to be processed by either the first or second processing unit.

12 Claims, 4 Drawing Sheets

EFFICIENT PROCESSOR LOAD BALANCING USING PREDICATION FLAGS

FIELD OF THE INVENTION

The embodiments are generally directed to queue management. More particularly, the embodiments are directed to managing work balancing between multiple processors using a shared queue.

BACKGROUND

Complexity of applications and computer programs continues to increase as users continue to expect more functions from smaller and smaller devices. In order to meet this demand, many products now include multiple ways to process information, for example using multiple processing units.

In order to meet the demands of computer users, designers have started developing ways in which multiple processing units, either multiple processing units on a single silicon die or multiple processing units in communication, can be integrated to collectively handle multiple tasks required for an application or program to run. For example, one processing unit may be handling graphical rendering for a computer game, while another may be handling processing the users actions, and another may be handling communication with other users' computers.

Integrating multiple processing units to simultaneously handle different tasks can be a very difficult task. The designers of these systems must make sure that all the tasks are completed, but that no two processing units are attempting to complete the same task. Thus, in current computer systems, a central or master processor first divides up the tasks into discrete tasks and then assigns the tasks to the different processing units, such as AP s, GPUs, ASICs, etc.

Dividing up the tasks ahead of time allows for the system to process multiple different tasks at the same time, while also guaranteeing that no task is processed twice. But this also leads to a less than optimal solution. If, for example, one of the processing units finishes up the tasks assigned to the processing unit before the others have started all of their tasks, the processing unit remains idle, even if there is additional work to be accomplished that has been assigned to other processing units. Designers often try to address this issue preemptively by estimating how long each task will take on each processing unit, and determining a theoretical optimal solution, But, if a processing unit does not execute exactly how the processing unit has been modeled, this still leads to processing units being idle while there is more work to be done.

BRIEF SUMMARY

Therefore, there is a need for an efficient way to dynamically balance a load between multiple processing units during execution of tasks.

A system, method, and memory device embodying some aspects of the present embodiments for efficient load balancing using predication flags are provided. The load balancing system includes a first processing unit, a second processing unit, and a shared queue. The first processing unit is in communication with a first queue. The second processing unit is in communication with a second queue. The first and second queues are each configured to hold a packet. The shared queue is configured to maintain a work assignment, wherein the work assignment is to be processed by either the first or second processing unit.

Further features and advantages of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate some embodiments and, together with the description, further serve to explain the principles of the embodiments and to enable a person skilled in the pertinent art to make and use the embodiments. Various embodiments are described below with reference to the drawings, wherein like reference numerals are used to refer to like elements throughout.

DETAILED DESCRIPTION

The following detailed description refers to the accompanying drawings that illustrate exemplary embodiments. Other embodiments are possible, and modifications can be made to the embodiments within the spirit and scope of the description. Therefore, the detailed description is not meant to limit scope. Rather, the scope of the claimed subject matter is defined by the appended claims.

It would be apparent to a person skilled in the relevant art that the embodiments, as described below, can be implemented in many different embodiments of software, hardware, firmware, and/or the entities illustrated in the figures. Thus, the operational behavior of embodiments will be described with the understanding that modifications and variations of the embodiments are possible, given the level of detail presented herein.

This specification discloses one or more systems that incorporate the features of some embodiments. The disclosed systems merely exemplify the embodiments. The scope of the embodiments is not limited to the disclosed systems. The scope is defined by the claims appended hereto.

The systems described, and references in the specification to "one system", "a system", "an example system", etc., indicate that the systems described may include a particular feature, structure, or characteristic, but every embodiment may not necessarily include the particular feature, structure, or characteristic. Moreover, such phrases are not necessarily referring to the same system. Further, when a particular feature, structure, or characteristic is described in connection with a system, it is understood that it is within the knowledge of one skilled in the art to affect such feature, structure, or characteristic in connection with other embodiments whether or not explicitly described.

1. Processor/Shared Queue System.

Figure 1:
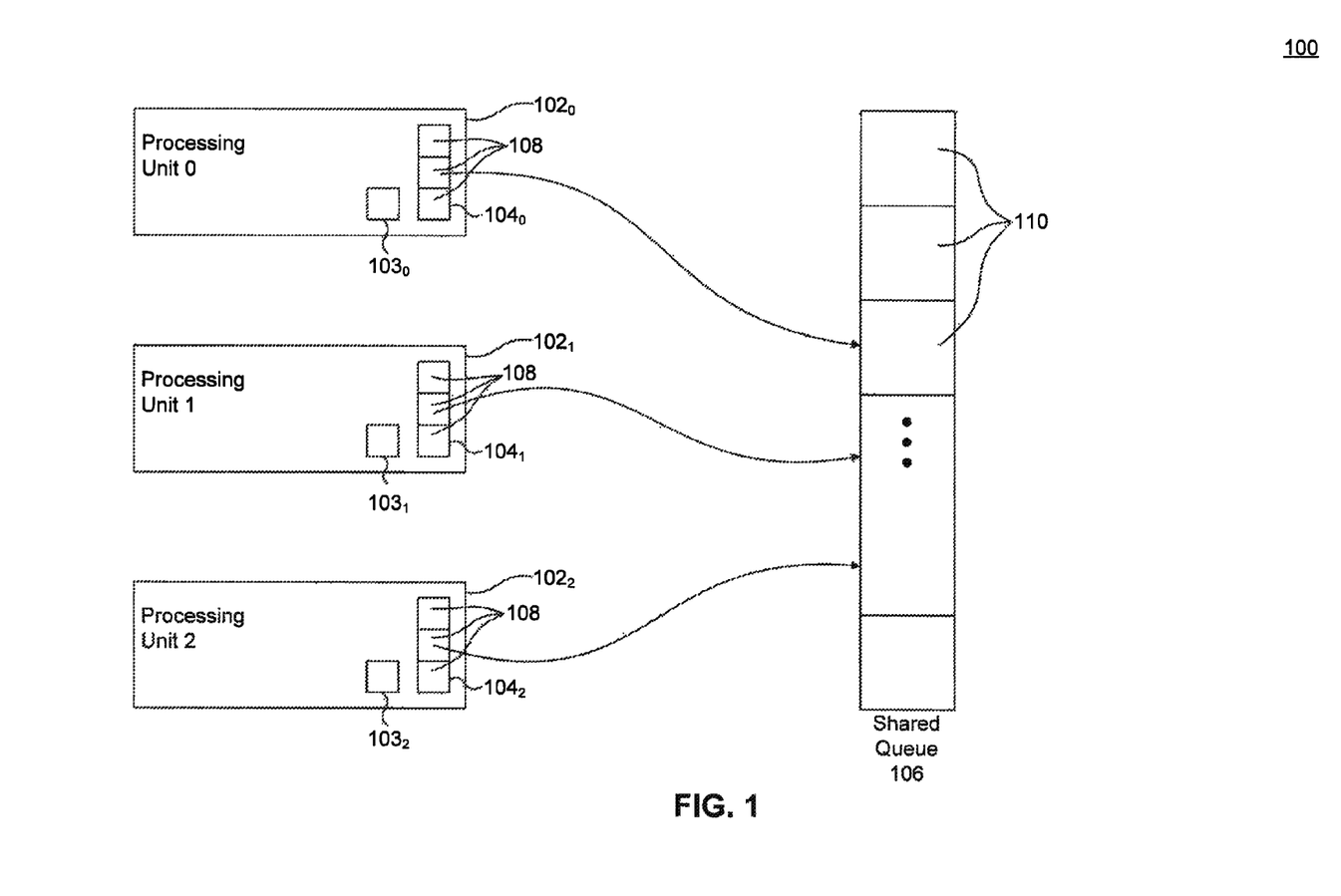
FIG. 1 is an illustration of a multiprocessor environment, according to an embodiment.

FIG. 1 shows a system 100, in which embodiments described herein can be implemented. In this example, system 100 includes one or more processing units 102 that are communicatively coupled to a shared queue 106.

In the example shown, each processing unit 102 includes a queue 104 and a local acquired bit memory 103. Each queue 104 can be configured to hold one or more packets 108 that point to work assignments 110 within the shared queue 106.

Queue 104 and shared queue 106 can be any queue known to a person skilled in the ant, e.g., a first-in-first-out queue, last-in-first-out queue, or circular queue. Queue 104 can be a mechanism that is used to store packets, where packets can be added or removed from the front or back of the queue. For example, in a first-in-first-out queue elements are added to the front of the queue and removed from the back, such that each item is removed in the order the item was inserted. In contrast, in a last-in-first-out queue items are both added to and removed from the queue from the top, such that the most recent item added to the queue is the first item removed from the queue.

Packets 108 are data stored in and retrieved from queues 104. In an embodiment, packets 108 can have a set size, for example 2, 4, 8, or 16 bytes. Each packet 108 represents a distinct task to be handled by a processor.

Work assignments 110 are tasks to be processed by a processors. Work assignments 110 are stored in a shared queue 106. In an embodiment, work assignments 110 can be variable length. In an embodiment, depending on the size of the task, i.e., the number of instructions needed to perform the task, work assignments 110 can be instructions for the task, if there are relatively few instructions, or can be pointers to a location where the instructions are located, for example in memory, if there are many instructions required to execute the task. For example, the instructions for a task like adding two values may be stored in a work assignment, Whereas the instructions for rending the image of a mirror may require that the work assignment contain a pointer to the instructions for this task.

Packets 108 and work assignments 110 can include packets 216 and work assignments 210, described below and illustrated in FIG. 2.

A person skilled in the art would understand that the processing units 102 could be any type of processing unit, e.g., a central processing unit, an advanced processing unit, a graphics processing unit, an application specific integrated circuit, or a field programmable gate array. A processing unit can be any device which is configured to receive work, i.e., work can be pushed to it by other devices, but not figured to request additional work, i.e., it cannot pull work from other devices.

2. Queue/Shared Queue System

Figure 2:
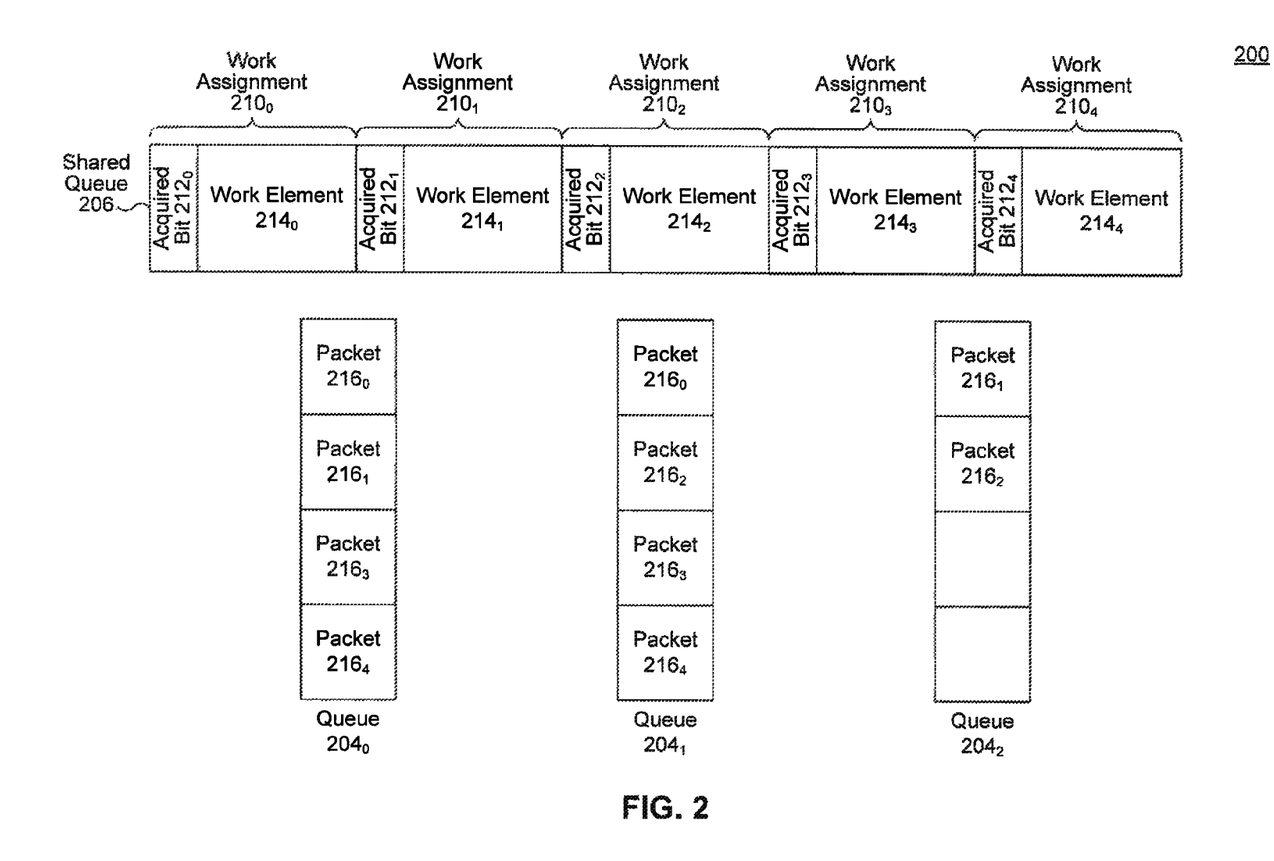
FIG. 2 is an illustration of a multiple queue environment, according to an embodiment.

FIG. 2 shows a system 200, in which embodiments described herein can be implemented. In this example, system 200 includes one or more queues 204 that are communicatively coupled to a shared queue 206.

In an embodiment, shared queue 206 is configured to contain one or more work assignments 210. For example, as shown in FIG. 2, shared queue 206 can contain five work assignments $210_0$-$210_4$. In an embodiment, each task stored in the shared queue 206, such as the work assignments 210 illustrated in FIG. 2, can include a work element 214 to be performed by a processing unit, e.g., processing units 102 of FIG. 1, and an acquired bit 212 indicating if the work assignment 210 has been assigned to a processing unit, e.g., processing units 102 of FIG. 1. For example, shared queue 206 can contain work elements $214_0$-$214_4$, and acquired bits $212_0$-$212_4$, where each acquired bit indicates whether an associated work element 214 has been assigned to a processing unit, e.g., processing units 102 of FIG. 1.

The work elements $214_0$-$214_4$ in shared queue 206 can either be direct work elements, i.e., instructions to be executed by a processing unit, e.g., processing units 102 of FIG. 1, to execute a task, or can be indirect work elements, i.e., pointers to instructions to be executed by a processing unit, e.g., processing units 102 of FIG. 1, to execute a task. A person skilled in the art would understand, provided the above description, that other embodiments are available depending on the system requirements, such as additional levels of indirection.

In an embodiment, queues $204_0$-$204_2$ are configured to contain one or more packets 216. For example, as shown in FIG. 2, queue $204_0$ can be configured to hold four packets $216_0$, $216_1$, $216_3$, and $216_4$. Packets 216 can be assigned to the queues 104 by (not shown) a central processing unit, a server, the processors themselves, or by other means known to a person skilled in the art. In an embodiment, packets 216 can be assigned based on the characteristics of the processing units and the work element 214 within the work assignments 210. For example, work assignment $210_2$ can require SIN capabilities and a processing unit, e.g., processing units $102_0$ of FIG. 1, associated with queue $204_0$ may not have that capability. In that circumstance, packet $216_2$, that includes a pointer o work assignment $210_2$, would not be placed in queue $204_0$.

In an embodiment, packets 216 in each queue 204 can include pointers to work assignments 210 within the shared queue 206. In addition, packets 216 in multiple queues 204 can point to the same work assignments 210. For example, as shown in FIG. 2, a queue 204, such as queue $204_0$, can contain packets $216_0$, $216_1$, $216_3$, and $216_4$ that point to work assignments $210_0$, $210_1$, $210_3$, and $210_4$, respectively, in shared queue 206. In addition, queue $204_1$, can also contain packets $216_0$, $216_3$, and $216_4$ that point to work assignments $210_0$, $210_3$, and $210_4$, respectively, in shared queue 206.

In an embodiment, each processing unit, e.g., processing units 102 of FIG. 1, can retrieve packets 216 from their respective queues 204. Processing units determine the next work assignment 210 in their queue 204 that has not been executed, for example by using the method described below. This allows for packets 216 in multiple queues 204 to point to the same work assignment 210 on the shared queue 206 without causing the work element 214 associated with that work assignment 210 to be executed more than once.

In an embodiment, the processing units, e.g., processing units 102 of FIG. 1, include ore or more atomic instructions, such as a compare and swap instruction. Atomic instructions can only be executed by one processing unit, e.g., processing units 102 of FIG. 1, at a time. Atomic instructions can allow, for example, only one processing unit to retrieve and set the acquired bit 212 for any work assignment 210, thus avoiding race conditions. For example, a race condition happens when two processing units both retrieve an unset acquired bit 212 for the same work assignment 210 before either one can set the acquired bit 212 for that work assignment 210. Thus, both processors may independently execute the work element 214 associated with work assignment 210.

This process, described below in more detail, allows the system to dynamically balance the work load. Balancing is achieved by assigning most or all of the work to all of the processing units and allowing each processing unit to handle an assigned task and then claim the next available task. For example, five tasks can each be assigned to the queues of two processors. As each processor finishes the task the processor is working on, the processor can dynamically choose the next work assignment from the work assignment, that have not been assigned. Thus, neither processor is idle while there are tasks that have not been assigned to a processor.

3. Queue Work Completion Process

Figure 3:
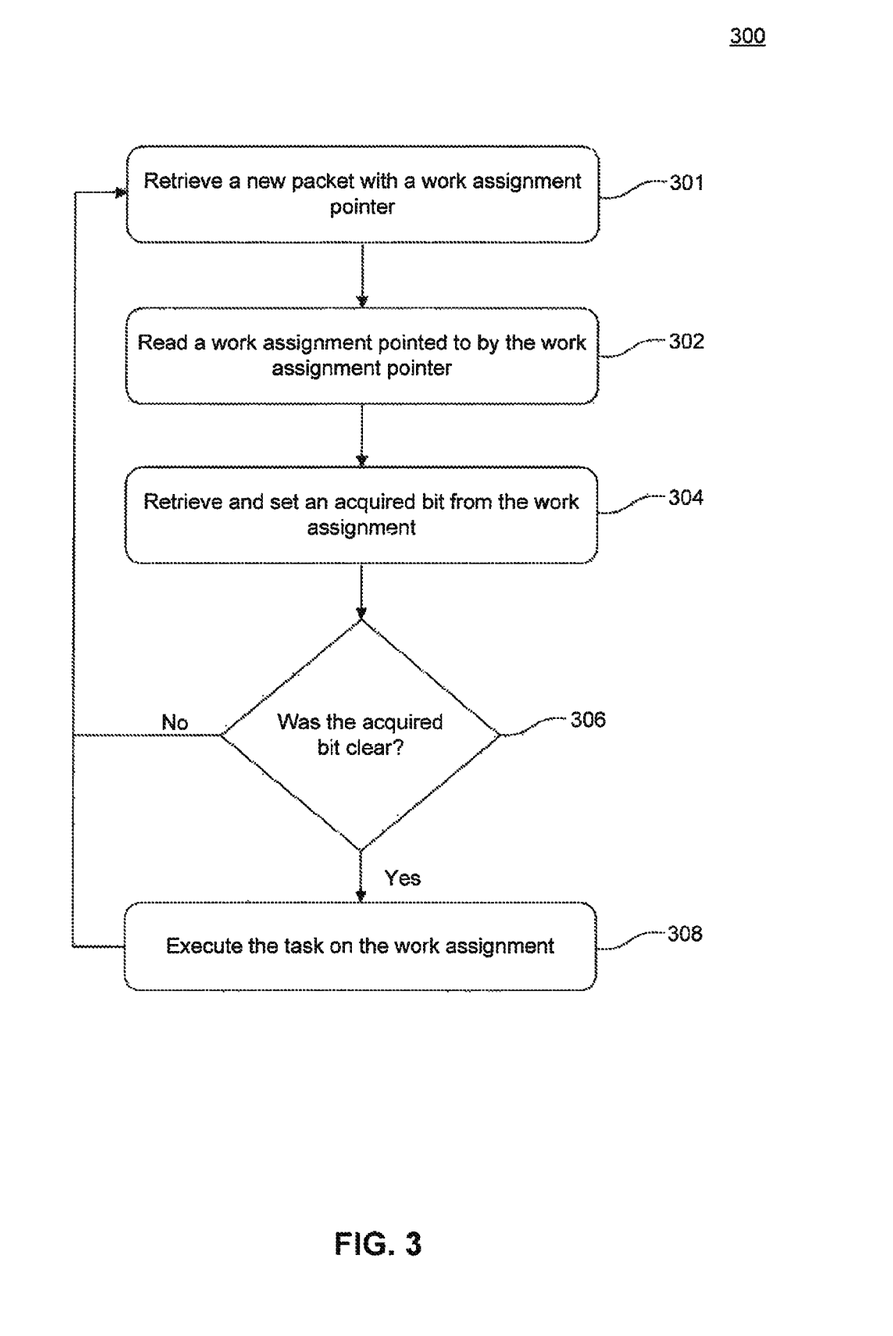
FIG. 3 is an illustration of a method of managing work between multiple queues, according to an embodiment.

FIG. 3 shows a flowchart depicting a method 300, according to an embodiment. For example, method 300 can be used to process packets from a queue and execute work assignments stored in a shared queue. In one example, method 300 may be performed by system 200 to execute work assignments $210_0$-$210_4$ on shared queue 206. It is to be appreciated that method 300 need not be performed in the order shown, or require all of the operations shown. Merely for convenience, and without limitation, method 300 is described with reference to FIGS. 1-2.

In step 301, a processing unit, e.g., processing units 102 of FIG. 1, can retrieve a new packet, e.g., a packet 216 of FIG. 2, in a queue, e.g., queue 204 of FIG. 2. In an embodiment, a packet 216 includes a work assignment pointer.

In step 302, a work assignment, e.g., work assignment 210 of FIG. 2, pointed to by the work assignment pointer is retrieved. In an embodiment, a processing unit can retrieve a work assignment in a shared queue pointed to by the work assignment pointer. For example, in FIG. 2, packet $216_0$ could be read from queue $204_0$. Packet $216_0$ could include a work assignment pointer that points to work assignment 2100 in shared queue 206.

In step 304, an acquired bit, e.g., acquired bit 212 of FIG. 2, is both retrieved and set from the work assignment. As discussed above, in an embodiment, step 304 can be executed using an atomic instruction to guarantee that only one processing unit accesses the acquired bit at a time. In an embodiment, a single instruction is used to both retrieve and set the acquired bit, thus limiting the time other processing units must wait in order to get access to the acquired bits in the shared queue. The single instruction can both retrieve the current acquired bit and set the current acquired bit in a single clock cycle. Thus, if the bit was set before, the acquired bit does not change, and the retrieved bit is set. If the acquired bit was clear, the clear version is retrieved and the acquired bit is set so that other processing units know that the associated work assignment is being handled. For example, a processing unit, e.g., processing units 102 of FIG. 1, could execute a single instruction, e.g., a compare and swap atomic instruction, for acquired bit $212_0$ associated with work assignment $210_0$. In this example, acquired bit $212_0$ can be copied to a local acquired bit memory, e.g., local acquired bit memory $103_0$ of FIG. 1, in the processing unit and acquired bit $212_0$ can be set in work assignment $210_0$.

In step 306, the processing unit determines if the acquired bit was set. If the acquired bit was set, then the system knows that another processing unit is handling the associated work assignment. Thus, the processing unit returns to step 301 to retrieve a new packet. If the acquired bit is clear, then the system knows that the processing unit can handle the work related to the associated work assignment. For example, if local acquired bit memory $103_0$ is set, then processing unit $102_0$ can continue on to the next packet, but if local acquired bit $103_0$ is clear then processing unit $102_0$ can handle the associated work assignment. Once the processing unit has completed handling the work for the associated work assignment, the processing unit will return to step 301 to retrieve a new packet.

In one example, before any of the work assignments have been processed, all acquired bits $212_0$-$212_4$ are clear. Processing unit $102_0$, which can be associated with queue $204_0$, retrieves packet $216_0$ according to step 301. In step 302, processing unit $102_0$ reads the pointer to work assignment $210_0$ from packet $216_0$. In step 304, processing unit $102_0$ retrieves acquired hit $212_0$, storing acquired bit $212_0$ in local acquired bit memory $103_0$, and sets acquired bit $212_0$. In step 306, processing unit $102_0$ checks local acquired bit memory $103_0$. Because local acquired bit memory $103_0$ was clear, processing unit $102_0$ executes work $214_0$ associated with work assignment $210_0$.

Concurrently, processing unit $102_1$, which can be associated with queue $204_1$, can retrieve packet $216_0$ according to step 301. In step 302, processing unit $102_1$ reads the pointer to work assignment $210_0$ from packet $216_0$. In step 304, processing unit $102_1$ retrieves acquired bit $212_0$, storing acquired bit $212_0$ in local acquired bit memory $103_1$, and sets acquired bit $212_0$. In step 306, processing unit $102_1$ checks local acquired bit memory $103_1$. Because local acquired bit memory $103_1$ was set (due to the earlier read and set instruction executed by processing unit $102_0$), processing unit $102_1$ continued to step 302 to execute the same method with packet $216_2$ and sets acquired hit $212_2$ and executes work $214_1$ associated with work assignment 210.

Concurrently, processing unit 102, which can be associated with queue $204_2$, retrieves packet $216_1$ according to step 302. Processing unit $102_2$ reads the pointer to work assignment $210_1$ from packet $216_1$. In step 304, processing unit $102_2$ retrieves acquired bit $212_1$, storing acquired bit $212_1$ in local acquired hit memory $103_2$, and sets acquired bit $212_1$. In step 306, processing unit $102_2$ checks local acquired bit memory $103_1$. Because local acquired bit memory $103_1$ was clear, processing unit $102_2$ executes work $214_1$ associated with work assignment $210_1$.

4. Queue Work Stealing Process

Figure 4:
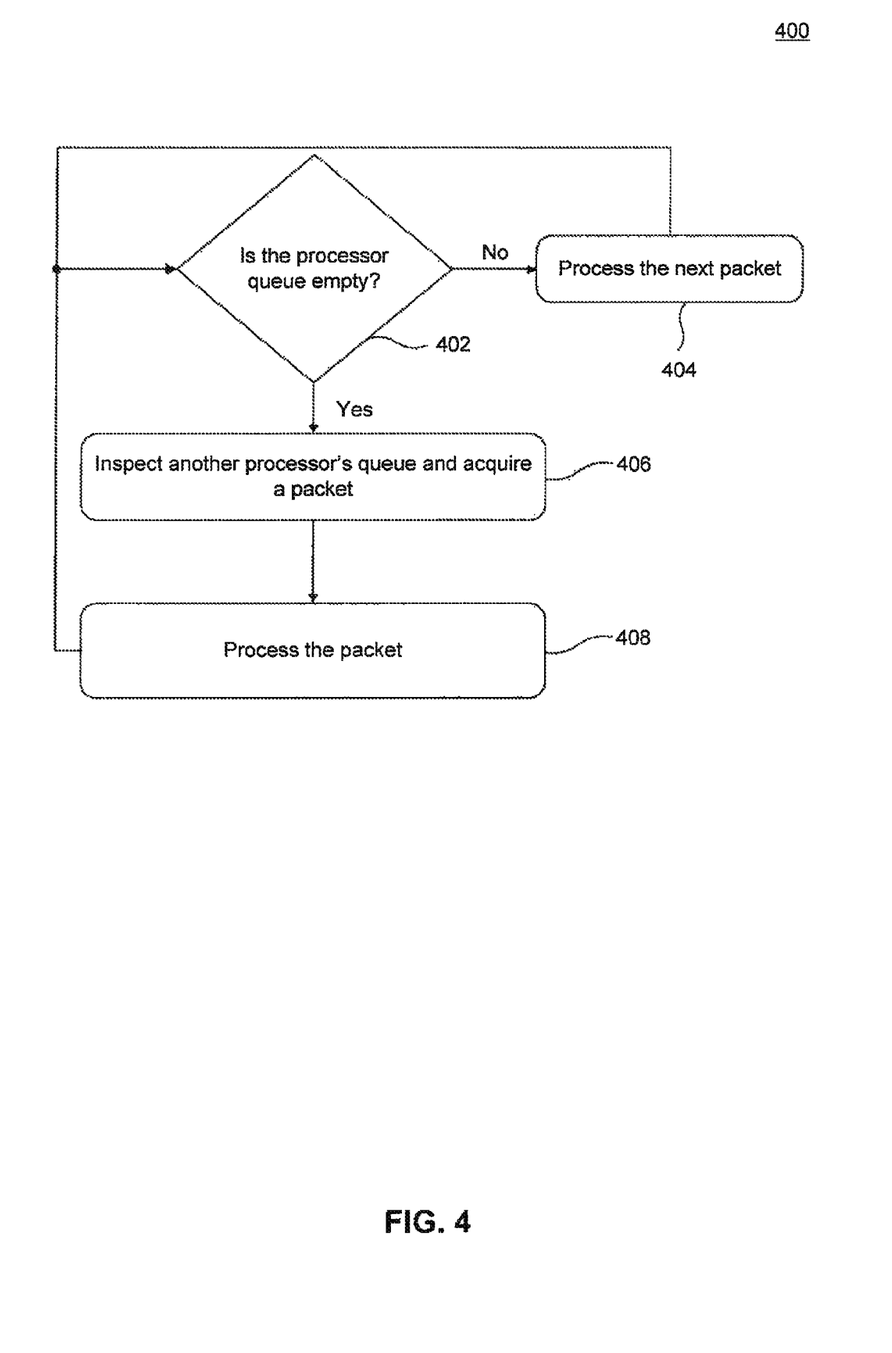
FIG. 4 is an illustration of a method of sharing work between multiple queues, according to an embodiment.

FIG. 4 shows a flowchart depicting a method 400, according to an embodiment. For example, method 400 can be used to process packets from a different queue if a current queue is empty. In one example, method 400 may be performed by system 200 to execute work assignments $210_0$-$210_4$ on shared queue 206. It is to be appreciated that method 400 need not be performed in the order shown, or require all of the operations shown. Merely for convenience, and without limitation, method 400 is described with reference to FIGS. 1-2.

In step 402, a processing unit checks to see if there is a new packet in the processing unit's queue. If so, the process continues to step 404, where the processing unit processes the new packet according to method 300 described above and illustrated in FIG. 3. For example, after completing, work $214_1$ associated with work assignment $210_1$, processing unit $102_2$ can process packet $216_2$, for example, according to method 300.

If the queue is determined to be empty in step 402, the processing unit continues to step 406. In step 406, the processing unit can inspect the queue of another processing unit in order to acquire an unprocessed work element. If there is a work element that has not been processed in the other processing unit's queue, the processing unit can acquire the packet associated with that work element. For example, processing unit $102_2$, after processing packet $216_2$, will have an empty queue $104_2$. In step 406, processing unit $102_2$ can attempt to acquire work from the queue of another processing unit, for example queue $104_0$ of processing unit $102_0$. Processing unit $102_2$ can acquire a packet, for example a packet pointing to work dement $214_3$. As with the normal processing of the packet, processing unit $102_2$ will set the acquired bit of the associated work assignment once it starts processing the packet so that when the other processing unit encounters a packet pointing to this work assignment, it will see that it is being processed by another processor, and move on.

In an embodiment, when a processing unit determines it has an empty queue, it can limit its search to other compatible processing units. For example, a processing unit can determine that the other processing unit is compatible if the second processing unit's capabilities are a subset of the processing unit's capabilities. For example processing unit $102_0$ and $102_1$ may not be able to process SIMD commands, whereas processing unit $102_2$ can process SIMD commands. If processing unit $102_0$'s queue was empty it could acquire a work element from processing unit $102_1$, but night not attempt to acquire a work element from processing unit $102_2$. Processing unit $102_0$ could do this because the packets in processing unit $102_2$'s queue may include work elements that require a SIMD capable processing unit.

Together, methods 300 and 400 provide a way in which one or more applications, attempting to accomplish one or more tasks, can dynamically assign tasks to processing units while balancing the work load. For example, when initially assigning packets to two processing units, a central processing unit may try to balance the work load between the two processing units by assigning packets based on models of how the processing units work. For example, if the first processing unit is modeled to be twice as fast as the second processing unit, the central processing unit may assign twice the number of packets to the first processing unit. Identical packets can appear in both queues. As described in method 300, the processing units can complete the work in each of their queues. If one processing unit finishes the packets assigned to that processing unit before the other one, for example because the models used were not accurate for the tasks assigned, that processing unit may steal packets from the other processing unit's queue, according to method 400. Thus the work load can both be initially balanced based on a prior model of each processing unit, and dynamically balanced based on the actual execution of each processing unit.

Embodiments can be accomplished, for example, through the use of general-programming languages (such as C or C++), hardware-description languages (HDL) including Verilog HDL, VHDL, Altera HDL (AHDL) and so on, or other available programming and/or schematic-capture tools (such as circuit-capture tools). The program code can be disposed in any known computer-readable medium including semiconductor, magnetic disk, or optical disk (such as CD-ROM, DVD-ROM). As such, the code can be transmitted over communication networks including the Internet and internets. It is understood that the functions accomplished and/or structure provided by the systems and techniques described above can be represented in a core (such as a CPU core and/or a GPU core) that is embodied in program code and may be transformed to hardware as part of the production of integrated circuits.

In this document, the terms "computer program medium" and "computer-usable medium" are used to generally refer to media such as a removable storage unit or a hard disk drive. Computer program medium and computer-usable medium can also refer to memories, such as system memory and graphics memory which can be memory semiconductors (e.g., DRAMs, etc.). These computer program products are means for providing software to an APD.

The embodiments are also directed to computer program products comprising software stored on any computer-usable medium. Such software, when executed in one or more data processing devices, causes a data processing device(s) to operate as described herein or, as noted above, allows for the synthesis and/or manufacture of computing devices (e.g., ASICs, or processors) to perform embodiments described herein. Embodiments employ any computer-usable or computer-readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments as contemplated by the inventors, and thus, are not intended to limit the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature that others can, by applying knowledge within the skill of the relevant art, readily modify and/or adapt for various applications such specific embodiments, without undue experimentation, without departing from the general concept presented. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope should not be limited by any of the above-described exemplary embodiments, but should be defined only in accordance with the following claims and their equivalents.

What is claimed is:

1. A system comprising:
    a shared queue configured to maintain one or more work assignments including a first work assignment, wherein each of the one or more work assignments comprise a work element and an acquired bit set to either a first or second value;
    a first queue configured to store a first packet that includes a pointer to a respective work element;
    a second queue configured to store a second packet that includes a pointer to the respective work element;
    a first processing unit in communication with the first queue configured to hold a first plurality of packets including the first packet;

a second processing unit in communication with the second queue configured to hold a second plurality of packets including the second packet;

wherein the one or more work assignments are processed by either the first processing unit or the second processing unit;

wherein the first processing unit is configured to:

retrieve the first packet from the first queue, determine the pointer to the first work assignment based on the first packet, evaluate if the acquired bit associated with the first work assignment is set to the first or second value, if the acquired bit is set to the first value, retrieve the work element for the first work assignment, set the acquired bit to the second value and execute the work element, and if the acquired bit is set to the second value, retrieve another packet from the first plurality of packets; and wherein the second processing unit is configured to:

retrieve the second packet from the second queue, determine the pointer to the first work assignment based on the second packet, evaluate if the acquired bit associated with the first work assignment is set to the first value or the second value, if the acquired bit is set to the first value, retrieve the work element for the first work assignment, set the acquired bit to the second value and execute the work element, and if the acquired bit is set to the second value, retrieve another packet from the second plurality of packets.

2. The system of claim 1, wherein the first and second processing units are configured to store a copy of the acquired bit.

3. The system of claim 1, wherein the work element comprises instructions to be executed.

4. The system of claim 1, wherein the work element comprises a pointer to instructions to be executed.

5. A method implemented in a computer system, comprising:

maintaining one or more work assignments in a shared queue including a first work assignment, wherein each of the one or more work assignments comprise a work element and an acquired bit set to either a first or second value;

storing a first plurality of packets including a first packet in a first queue in communication with a first processing unit, the first packet including a pointer to a respective work element;

storing a second plurality of packets including a second packet in a second queue in communication with a second processing unit, the second packet including a pointer to a respective work element;

retrieving, by the first processing unit, the first packet from the first queue, determining, by the first processing unit, the pointer to the first work assignment based on the first packet;

evaluating, by the first processing unit, if the acquired bit associated with the first work assignment is set to the first or second value;

if the acquired bit is set to the first value:

retrieving, by the first processing unit, the work element for the first work assignment, setting, by the first processing unit, the acquired bit, and executing, by the first processing unit, the work element, and if the acquired bit is set to the second value, retrieving, by the first processing unit, another packet from the first plurality of packets;

retrieving, by the second processing unit, the second packet from the second queue, determining, by the second processing unit, the pointer to the first work assignment based on the second packet;

evaluating, by the second processing unit, if the acquired bit associated with the first work assignment is set to the first or second value;

if the acquired bit is set to the first value:

retrieving, by the second processing unit, the work element for the first work assignment, setting, by the second processing unit, the acquired bit, and executing, by the second processing unit, the work element; and if the acquired bit is set to the second value, retrieving, by the second processing unit, another packet from the second plurality of packets.

6. The method of claim 5, further comprising storing, by the first or second processing unit, a copy of the acquired bit.

7. The method of claim 5, wherein the work element comprises instructions to be executed.

8. The method of claim 5, wherein the work element comprises a pointer to instructions to be executed.

9. A non-transitory computer readable storage medium, having instructions recorded thereon that, when executed by a computing device, cause the computing device to perform operations comprising:

maintaining one or more work assignments in a shared queue including a first work assignment, wherein each of the one or more work assignments comprise a work element and an acquired bit set to either a first or second value;

storing a first plurality of packets including a first packet in a first queue in communication with a first processing unit, the first packet including a pointer to a respective work element;

storing a second plurality of packets including a second packet in a second queue in communication with a second processing unit, the second packet including a pointer to a respective work element;

retrieving, by the first processing unit, the first packet from the first queue, determining, by the first processing unit, the pointer to the first work assignment based on the first packet;

evaluating, by the first processing unit, if the acquired bit associated with the first work assignment is set to the first or second value;

if the acquired bit is set to the first value:

retrieving, by the first processing unit, the work element for the first work assignment, setting, by the first processing unit, the acquired bit, and executing, by the first processing unit, the work element, and if the acquired bit is set to the second value, retrieving, by the first processing unit, another packet from the first plurality of packets;

retrieving, by the second processing unit, the second packet from the second queue, determining, by the second processing unit, the pointer to the first work assignment based on the second packet;

evaluating, by the second processing unit, if the acquired bit associated with the first work assignment is set to the first or second value;

if the acquired bit is set to the first value:
   retrieving, by the second processing unit, the work element for the first work assignment,
   setting, by the second processing unit, the acquired bit, and
   executing, by the second processing unit, the work element; and
if the acquired bit is set to the second value, retrieving, by the second processing unit, another packet from the second plurality of packets.

10. The non-transitory computer readable storage medium of claim 9, further comprising storing, by the first or second processing unit, a copy of the acquired bit.

11. The non-transitory computer readable storage medium of claim 9, wherein the work element comprises instructions to be executed.

12. The non-transitory computer readable storage medium of claim 9, wherein the work element comprises a pointer to instructions to be executed.

* * * * *